United States Patent [19]

Hense et al.

[11] Patent Number: 4,536,962
[45] Date of Patent: Aug. 27, 1985

[54] DATUM POINT LOCATION APPARATUS

[75] Inventors: Thomas R. Hense, New Berlin; Ronald M. Rudolph, Oak Creek, both of Wis.

[73] Assignee: Applied Power Inc., Milwaukee, Wis.

[21] Appl. No.: 552,768

[22] Filed: Nov. 17, 1983

[51] Int. Cl.³ .............................................. G01B 5/03
[52] U.S. Cl. ................. 33/516; 33/180 AT; 33/189
[58] Field of Search ............... 33/1 CC, 174 R, 174 J, 33/180 AT, 181 AT, 189

[56] References Cited

U.S. PATENT DOCUMENTS

| | | | |
|---|---|---|---|
| 2,095,059 | 10/1937 | Donnelly, Jr. | 33/174 J |
| 2,376,601 | 5/1945 | Kiesel | 33/189 |
| 2,853,794 | 9/1958 | Van Winkle | 33/180 AT |
| 3,561,125 | 2/1971 | Zeidler | 33/1 M |
| 3,807,050 | 4/1974 | Showalter | 33/286 |
| 4,165,567 | 8/1979 | Olsson | 33/288 |
| 4,174,623 | 11/1979 | LeGrand et al. | 33/180 AT X |
| 4,207,681 | 6/1980 | Bayorgeon et al. | 33/180 AT |
| 4,329,784 | 5/1982 | Bjork | 33/180 AT |

FOREIGN PATENT DOCUMENTS 103198 4/1926 Austria .............................. 33/174 J

OTHER PUBLICATIONS

Blackhawk Diagnostic Measuring Accessory Operating Instructions, 1982, 18 pages.

Primary Examiner—Richard R. Stearns
Attorney, Agent, or Firm—Fred Wiviott

[57] ABSTRACT

A motor vehicle datum locating fixture includes a base adapted to be secured in one of a plurality of discrete locations on a frame which supports the vehicle and first, second and third bars. A first clap is mounted on the base to fix the first bar in any one of an indefinite number of perpendicular and rotational positions relative to the base. A second clamp is disposed adjacent the end of the first bar for securing the second bar in any one of an indefinite number of perpendicular and angular position relative to the first bar. The second bar also includes a support for supporting the third bar at a fixed perpendicular position relative to the second bar.

8 Claims, 4 Drawing Figures

DATUM POINT LOCATION APPARATUS

BACKGROUND OF THE INVENTION

Before a damaged motor vehicle can be repaired, it is necessary to determine the extent to which the location of datum points on the vehicle deviate from manufacturer's specifications. Repair is then achieved by reforming damaged portions of the vehicle until all datum points have been returned to correct relative positions. The proper repair of body damage is very important in vehicles of so called unibody construction since accurate body alignment is essential for correct vehicle suspension and steering.

The systems for measuring the damage or misalignment of vehicle bodies are commonly called measuring bridges or measuring benches. One such assembly generally includes a fixed frame having a plurality of support fixtures for engaging key datum points on the vehicle, whereby the vehicle is located in a predetermined orientation relative to a fixed center line and a datum plane. With the vehicle supported in this manner, measuring bridges or benches are employed for determining whether reference points in the vehicle are located in correct three dimensional positions relative to the center line and datum plane. The location of these datum points differ in vehicles of different manufactures and between different vehicle models of the same manufacturer. As the result, prior art measuring bridges or benches require a different set of measuring fixtures for substantially each vehicle model and body style. This substantially increases the cost of such systems, particularly as a result of a proliferation of new models which require the continued acquisition of additional fixtures.

SUMMARY OF THE INVENTION

The object of the invention to provide an adjustable fixture for locating automobile datum points which may be used with a variety of automobile models.

This and other objects and advantages of this the present invention will become more apparent from the detailed description thereof taken with the accompanying drawings.

In general terms the invention comprises a motor vehicle datum locating fixture having a base adapted to be secured to a motor vehicle support frame in any one of a plurality of discreet locations, and first, second and third elongate means. First clamp means fixes the first elongate means in any one of a plurality of axial and angular positions relative to the base, and second clamping means is disposed on the first elongate means for fixing the second elongate means with its longitudinal axis extending perpendicularly to the direction in which the axis of said first elongate means extends, and in any one of a plurality of rotational angles, and third means is provided for mounting the third elongate means with its axis extending in a direction perpendicular to the direction in which the axis of the second elongate means extends.

DETAILED DESCRIPTION OF THE PREFERRED EMBODIMENT

Figure 2:
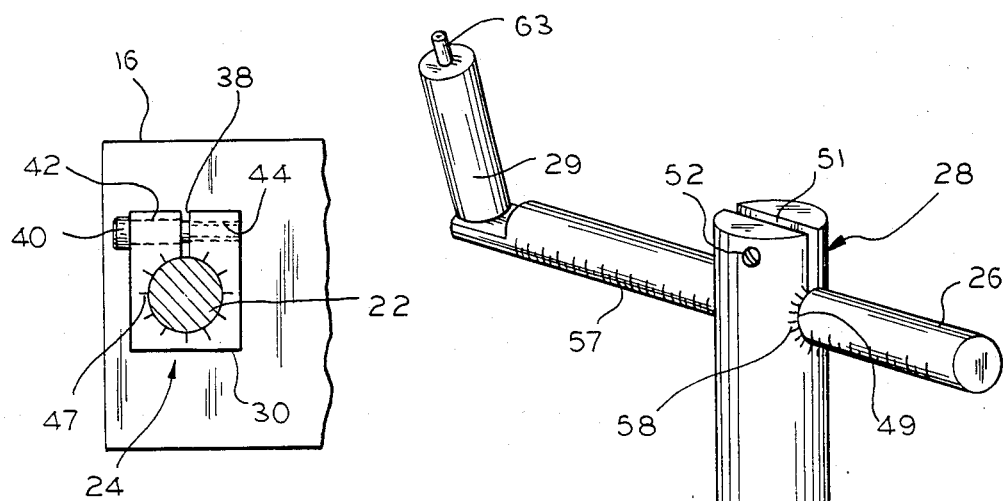
FIG. 2 is a view taken along lines 2—2 of FIG. 1.
Figure 1:
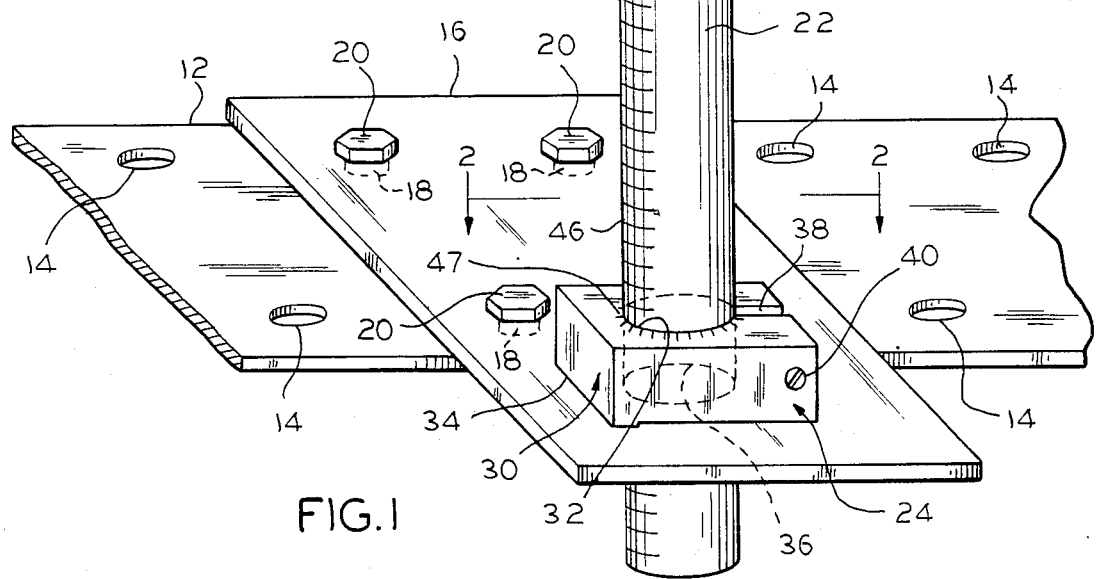
FIG. 1 is a perspective view of the universal fixture in accordance with the present invention.
Figure 3:
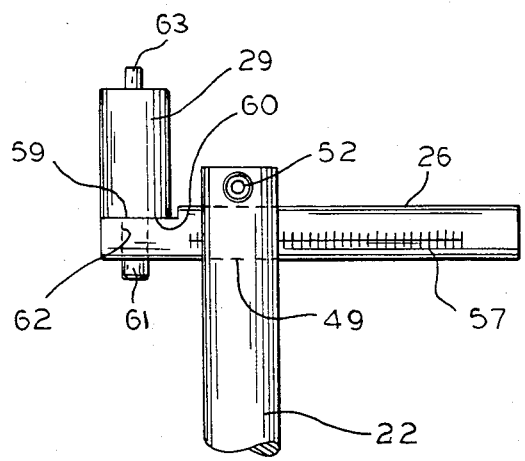
FIG. 3 is a side view of a portion of the fixture shown in FIG. 1.
Figure 4:
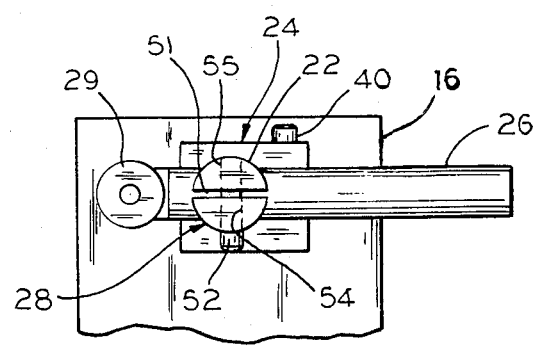
FIG. 4 is a top plan view of a portion of fixture shown in FIG. 1.

FIG. 1 shows an adjustable fixture 10 in accordance with the preferred embodiment of the invention and which may be employed for locating a datum point on a motor vehicle relative to a reference point on a measuring bridge or bench. The fixture 10 may also be used for the manufacture of permanent fixtures to be used for locating the same datum point on like vehicles.

Those skilled in the art will appreciate that the adjustable fixture 10 illustrated in FIG. 1 will be employed with a measuring bridge or bench such as that shown in application Ser. No. 357,581, filed Mar. 12, 1982 now U.S. Pat. No. 4,479,205. The details of such a measuring bridge are known and accordingly will not be discussed in detail for the sake of brevity. For understanding the invention, it will be sufficient to state that the bridge includes a main frame 12 upon which the vehicle to be repaired is supported. A plurality of locating holes 14 are formed in the frame 12 and are arranged in a predetermined array to provide mounting points of known cooridinates relative to a reference plane and a vehicle center line. These mounting points are used to locate fixture such as that shown in FIG. 1.

The fixture 10 includes a base 16 having a plurality of holes 18 which are spaced from each other distances which correspond to the spacing of openings 14 on frame 12. This permits the fixture 10 to be located at predetermined horizontal corrdinance relative to the reference plane and centerline of the vehicle. The fixture 10 is then secured to the frame 12 in any suitable means, such as by bolts 20 which are inserted through aligned openings 14 and 18 and secured by nuts (not shown).

The fixture 10 also includes a first bar 22 adapted to be fixed in any one of an indefinite number of perpendicular and angular positions relative to a base 16, by means of a first clamp 24. A second bar 26 may be fixed in any one of an indefinite number of transverse and angular positions relative to bar 22 by means of a second clamp 28 integral with the upper end of the bar 22. A third bar 29 is releasably received at the outer end of bar 26.

The clamp 24 comprises a generally rectangular member 30 having a center bore 32 complimentary with the bar 22. Member 30 is secured to the base 16 along one side 34 with the bore 32 in coaxial alignment with an opening 36 in the base 16 and sized to permit the bar 22 to pass freely therethrough. The remaining edges of the member 30 are free of the base 16 and there is a slit 38 extending from the bore 32 to the side of the member 30 opposite the edge 34. A clamp screw 40 extends through a first opening 42 in member 30 perpendicular to and on one side of the slit 38 and into a coaxial threaded hole 44 formed in member 30 on the opposite side of slit 38. It will be appreciated that when the screw 40 is tightened, the sides of the member 30 will be drawn together at the slit 38 to clamp the bar 22 in a fixed perpendicular and angular position relative to the base 16.

A first scale 46 is provided longitudinally on bar 22 and a second scale 47 is formed on the member 24 in an angular relation around the upper end of bore 32. In this manner the perpendicular and angular positions of bar 22 relative to the base 16 can be accurately established prior to clamping by means of screw 40.

The second clamp 28 comprises a transverse bore 49 formed at the upper end of bar 22 and perpendicular to its longitudinal axis. In addition, a slit 51 is formed in bar 22 and extends from its upper end downwardly to intersect the bore 49 along a line parallel to its longitudinal axis. Clamp screw 52 extends through an opening 54 in bar 22, across the slit 51 and into a coaxial threaded hole 55 on the opposite side of slit 51.

The bar 26 is received in bore 49 and has a linear scale 57 extending along the one side. In addition, an angular scale 58 is disposed on bar 22 in surrounding relation to bore 49. It will be appreciated that the scales 47 and 48 permit the longitudinal and angular position of bar 26 relative to bar 22 to be accurately determined. Once the bar has been located in the desired position, it may be clamped by tightening the screw 52 to bring the portions of the bar 22 on the opposite sides of slit 51 toward each other.

The bar 26 has a flat surface 59 machined in one end and parallel to its longitudinal axis. The bar 29 is generally cylindrical and has a flat end surface 60 engageable with the surface 59 and a pin 61 extending coaxially from the surface 60 and received in a hole 62 formed in bar 26 in and extending perpendicularly to the surface 57. In this manner the bar 29 can be loosely mounted on bar 26. A datum locating projecting 63 extends coaxially from the opposite end of bar 29.

When the assembly 10 is used as a universal fixture, the operator will determine from vehicle specification various horizontal, vertical and angular relationships of datum points relative to the reference plane and the vehicle center line. From this information the angular and perpendicular positions of bars 22 and 26 will be determined. The bars will then be placed in these positions and the clamp screws 40 and 52 tightened. With the base then affixed to the appropriate holes 14 in frame 12, and with the bar 29 in position, the locating tip 63 should engage the appropriate vehicle datum point. If the vehicle datum point does not coincide with the locating point 63, reformation of the vehicle is indicated.

When the fixture 10 is to be employed for the manufacture of fixtures for specific vehicle models, the reverse procedure is employed. More particularly, the vehicle is mounted in the frame 12 and clamped in position. The base 16 is also mounted on the frame 12 and located in the correct position by aligning the holes 18 in base 16 with the appropriate holes 14 in frame 12 and inserting bolts 20. Locking screws 40 and 52 are loosened. The bars 22 and 26 are then moved axially and rotated until the locating point 63 engages the desired vehicle datum point. The screws 40 and 52 were then tightened to lock the bars 22 and 26 in position. After the assembly has been tightened with all of the members in the correct relative angular and longitudinal positions for the particular vehicle model, the fixture is removed from the frame 12 and may then be duplicated by fabricating exactly corresponding units.

Where only a single embodiment of the invention has been illustrated and described, other embodiments will be apparent to those skilled in the art from the foregoing description. For example, a clamp similar to clamp 28 may be used to secure bar 29 to bar 26, and additional bars may be similarly attached to bar 29. Accordingly, the invention is not intended to be limited by the foregoing description, but only by the scope of the appended claims.

We claim:

1. A motor vehicle datum locating fixture includes a base having means for securing the base to a support frame so that the base can be secured to a frame in any one of a plurality of discreet locations, first, second and third elongate bar means which are circular in transverse cross-section, first clamping means for fixing said first elongate bar means, in any of a plurality of axial and angular positions relative to the base, second clamping means disposed on said first elongate bar means for fixing said second elongate bar means with its longitudinal axis extending perpendicular to the direction in which the axis of said first elongate bar means extends and in any one of a plurality of rotational angles, said first and second clamping means including clamp means and means slidably and rotatably engaging said first and second bar means, respectively, to permit said first and second bar means to be slid axially and rotated in their respective first and second clamping means prior to the clamping thereof so that each may be positioned in a selected angular and longitudinal position relative to its respective clamping means, and third means for mounting said third elongate bar means with its axis extending in a direction perpendicular to the direction in which the axis of the second bar means extends.

2. The fixture set forth in claim 1 and including measuring means disposed on said first and second bar means and said first and second clamping means for indicating the axial and rotational positions of said first and second elongate bar means relative to each other and to said base.

3. The fixture set forth in claim 2 wherein said first and second clamping means each include a bore for receiving its respective first and second bar means and means for tightening the sides of said bore against said respective bar means.

4. The fixture set forth in claim 3 wherein said second clamping means comprises a bore formed adjacent one end of said first bar means and perpendicular to its axis and a slit extending from the end of said first bar means to intersect the bore, and means for moving the portions of the bar means on the opposite sides of said slit toward and away from each other.

5. The fixture set forth in claim 4 wherein said base includes a plurality of mounting means arranged in a predetermined array for mounting the base on a frame in one of a plurality of discreet locations.

6. The fixture set forth in claim 5 wherein said base comprises a plate and said mounting means comprises a plurality of holes formed in said plate, said first clamping means being mounted on said plate with said bore extending perpendicular thereto, and a hole formed in said plate coaxially with said bore to permit said first elongate means to extend therethrough whereby the axial position of said first elongate means may be varied relative to said plate.

7. The fixture set forth in claim 2 wherein said base includes a plurality of mounting means arranged in a predetermined array for mounting the base on a frame in one of a plurality of discreet locations.

8. The fixture set forth in claim 7 wherein said base comprises a plate and said mounting means comprises a plurality of holes formed in said plate, said first clamping means being mounted on said plate with said bore extending perpendicular thereto, and a hole formed in said plate coaxially with said bore to permit said first elongate means to extend therethrough whereby the axial position of said first elongate means may be varied relative to said plate.

* * * * *